(12) United States Patent
Selig et al.

(10) Patent No.: US 7,475,606 B2
(45) Date of Patent: Jan. 13, 2009

(54) LOAD CELL

(75) Inventors: Klaus Peter Selig, Balingen-Weilstetten (DE); Klaus Wurster, Pliezhausen (DE)

(73) Assignee: Bizerba GmbH & Co. KG, Balingen (DE)

( * ) Notice: Subject to any disclaimer, the term of this patent is extended or adjusted under 35 U.S.C. 154(b) by 148 days.

(21) Appl. No.: 11/281,617

(22) Filed: Nov. 18, 2005

(65) Prior Publication Data

US 2006/0112769 A1 Jun. 1, 2006

Related U.S. Application Data

(63) Continuation-in-part of application No. PCT/EP2004/004662, filed on May 3, 2004.

(30) Foreign Application Priority Data

May 28, 2003 (DE) ................. 103 25 390

(51) Int. Cl.
*G01L 1/04* (2006.01)
*G01G 3/15* (2006.01)
(52) U.S. Cl. .............. 73/862.626; 73/862.621; 73/862.471; 177/211
(58) Field of Classification Search ............ 73/717, 73/862.621–862.629, 862.632, 862.636, 73/862.637; 250/227.14; 177/211, 210 EM, 177/230, 231; 338/2, 4
See application file for complete search history.

(56) References Cited

U.S. PATENT DOCUMENTS 2,814,946 A 12/1957 Harris, Jr.
3,100,997 A * 8/1963 Lorenz .................. 73/705
3,272,006 A * 9/1966 Eckard ............... 73/862.622
3,335,381 A 8/1967 DiGiovanni
3,422,445 A * 1/1969 Jacobson ............ 73/862.629

(Continued)

FOREIGN PATENT DOCUMENTS

DE 23 33 363 A1 3/1975

(Continued)

OTHER PUBLICATIONS

English Abstract of DE 19609921 (Scherer et al.). Published Sep. 18, 1997. Accessed online on Jan. 15, 2008. <http://ep.espacenet.com/>.*

(Continued)

*Primary Examiner*—Edward Lefkowitz
*Assistant Examiner*—Punam Patel
(74) *Attorney, Agent, or Firm*—Leydig, Voit & Mayer, Ltd.

(57) ABSTRACT

A load cell with an elastically deformable membrane force transducer for receiving forces to be determined, with a sensor arrangement for detecting the deformation of the force transducer and its conversion into an electric weight signal, which is robust and can also be installed in narrow spaces and can receive and determine tensile forces as well as pressure forces, is disclosed, comprising a housing surrounding the force transducer essentially on all sides and having an opening, through which the membrane force transducer can be acted upon with the force to be determined, wherein the membrane force transducer comprises a force introduction member arranged centrally and at the edge area an edge part projecting beyond at least one of the membrane surfaces.

26 Claims, 4 Drawing Sheets

U.S. PATENT DOCUMENTS

| | | | |
|---|---|---|---|
| 3,638,497 A | | 2/1972 | Frenkel |
| 3,960,013 A | * | 6/1976 | Ormond ............... 177/211 |
| 4,221,134 A | * | 9/1980 | Ekstrom, Jr. ............ 73/721 |
| 4,267,725 A | * | 5/1981 | Roth et al. ........... 73/862.629 |
| 4,442,474 A | * | 4/1984 | de Jong et al. .......... 361/283.4 |
| 4,827,240 A | | 5/1989 | Häfner |
| 4,936,148 A | * | 6/1990 | Shaw et al. ............. 73/728 |
| 5,028,807 A | * | 7/1991 | Kawai et al. ............ 307/119 |
| 5,705,751 A | * | 1/1998 | Briefer et al. ........... 73/722 |
| 6,104,100 A | | 8/2000 | Neuman |

FOREIGN PATENT DOCUMENTS

| | | |
|---|---|---|
| DE | 35 34 608 A1 | 4/1987 |
| DE | 41 32 108 A1 | 4/1993 |
| DE | 196 09 921 A1 | 9/1997 |
| DE | 36 27 127 A1 | 2/1998 |
| DE | 100 03 569 A1 | 8/2001 |
| DE | 10 2005 010 982 A1 | 9/2006 |

OTHER PUBLICATIONS

English Translation of DE 10003569 (Jager et al.). Obtained Sep. 2007. Translated by Schreiber Translation, Inc.*

U.S. Appl. No. 11/844,418, filed Aug. 24, 2007, Wehinger et al.

* cited by examiner

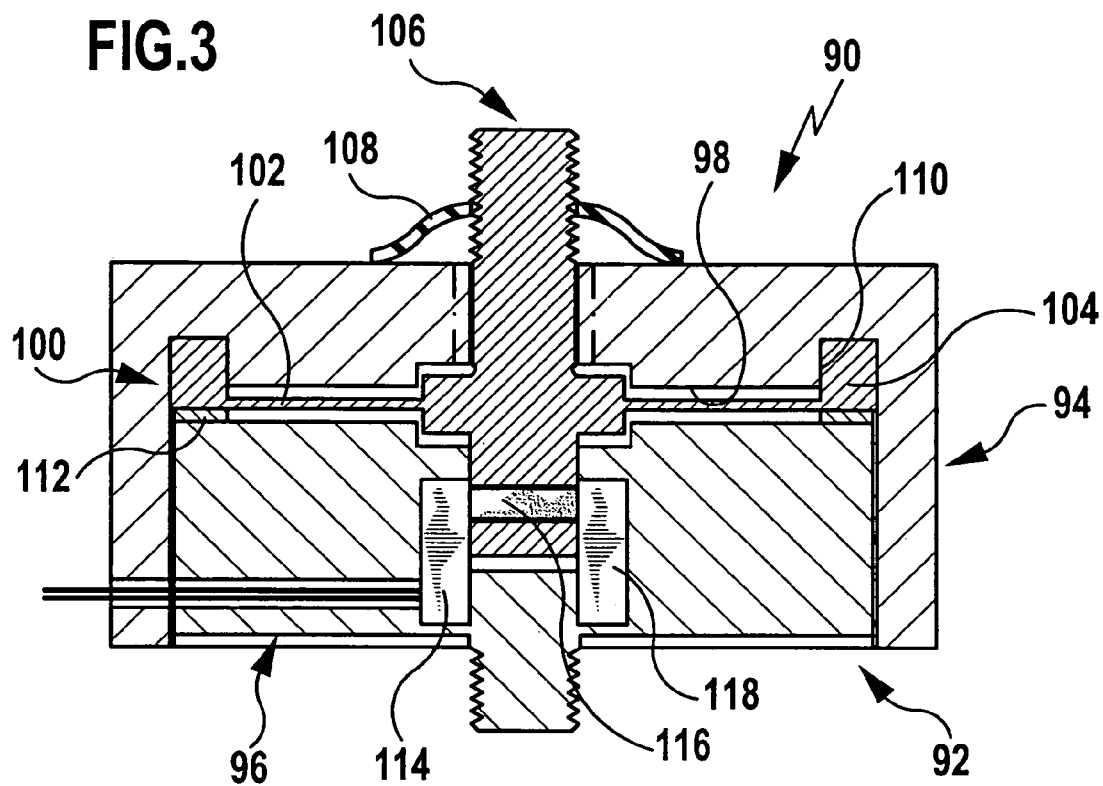
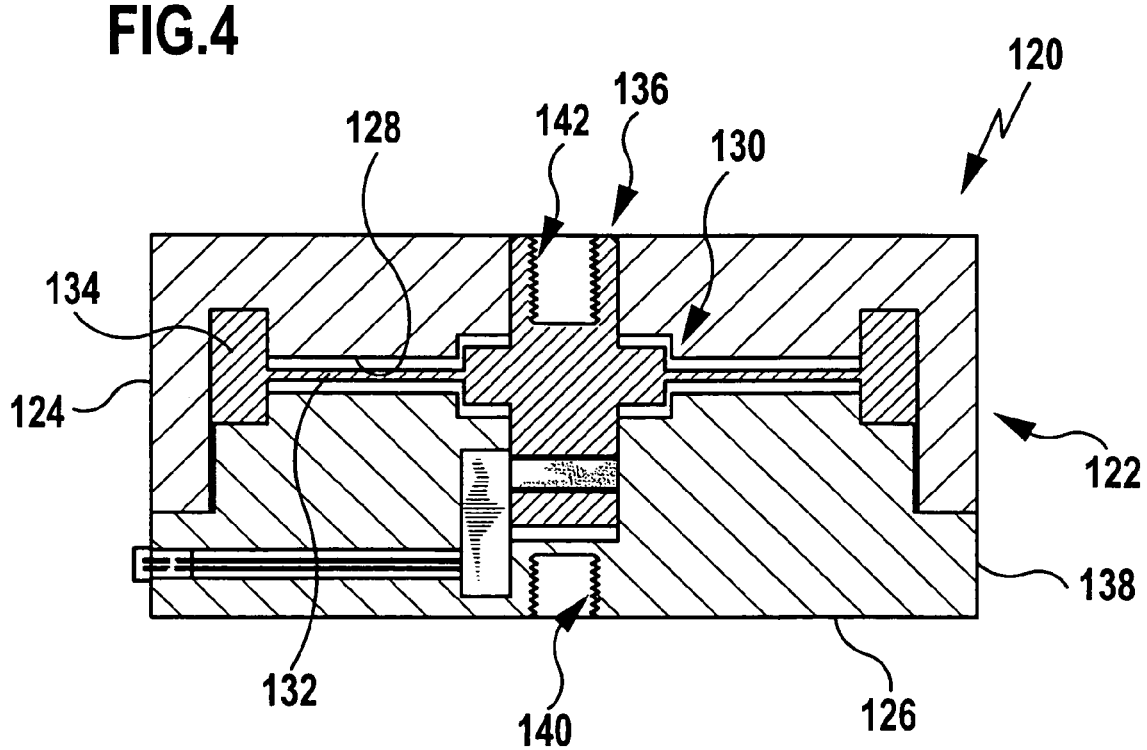

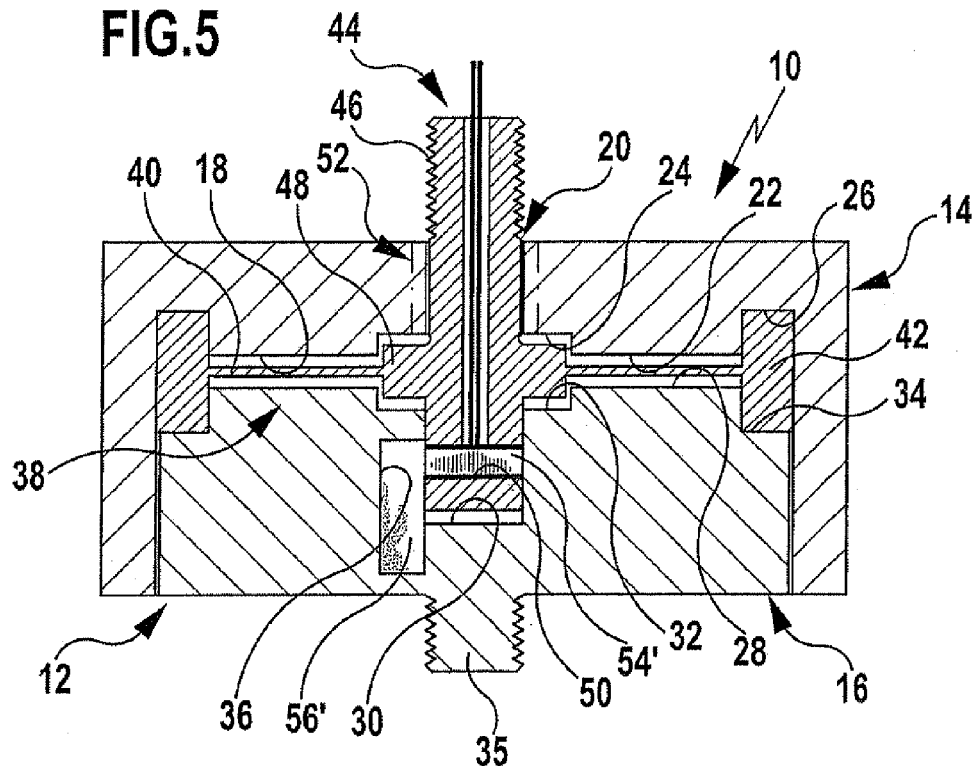
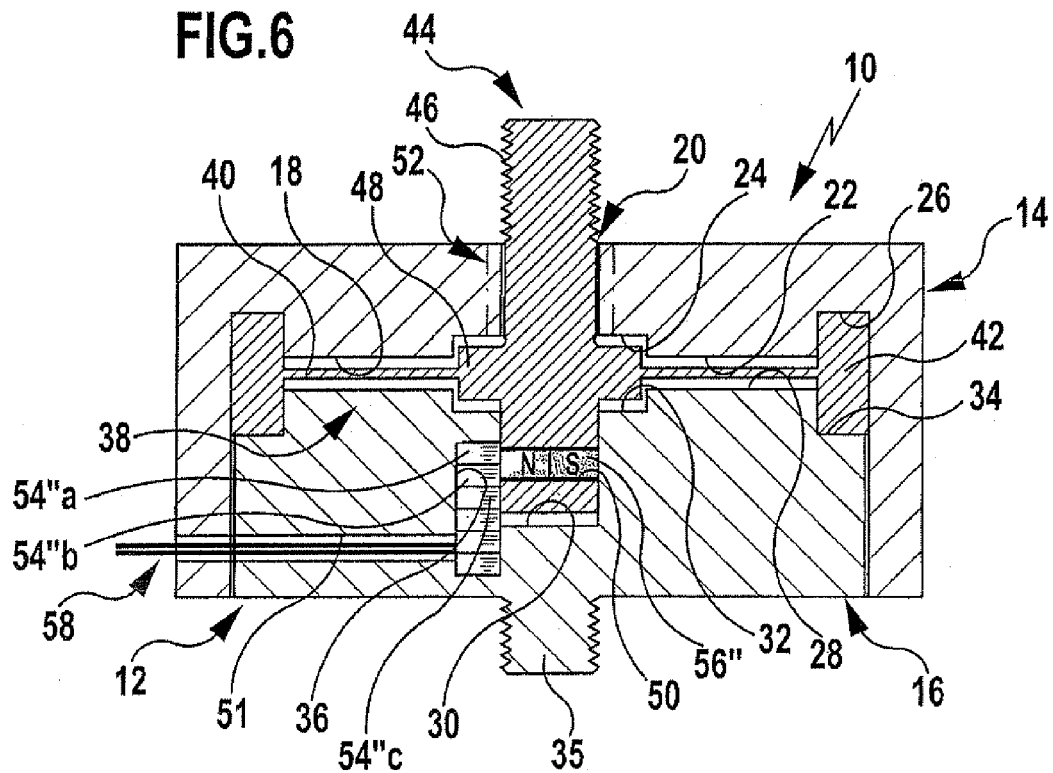

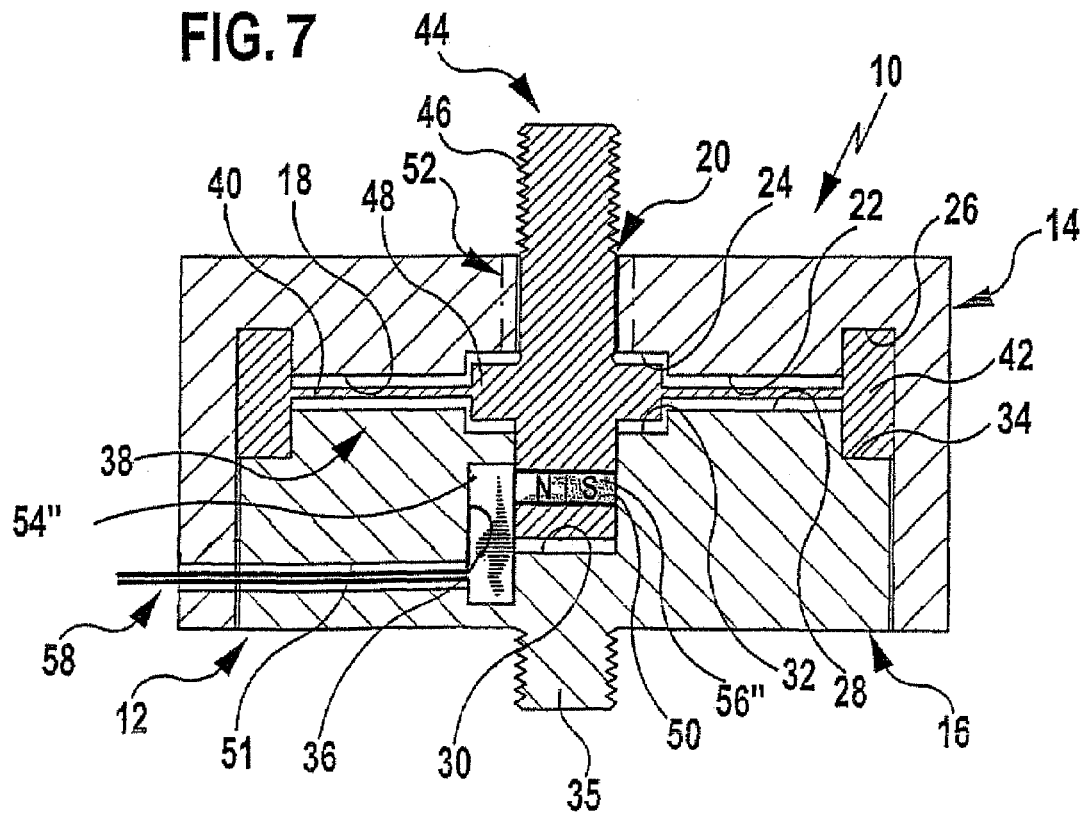

LOAD CELL

This application is a continuation-in-part of International application number PCT/EP2004/004662 filed on May 3, 2004.

The present disclosure relates to the subject matter disclosed in International application number PCT/EP2004/004662 of May 3, 2004 and German application number 103 25 390.4 of May 28, 2003, which are incorporated herein by reference in their entirety and for all purposes.

BACKGROUND OF THE INVENTION

The invention relates to a load cell (dynamometric cell) with an elastically deformable membrane force transducer for receiving forces to be determined, with a sensor arrangement for detecting the deformation of the force transducer and its conversion into an electric weight signal.

A load cell with a membrane force transducer is known, for example, from DE 36 27 127 A1. This load cell is designed in the form of a load box, with which a support element resistant to bending keeps the membrane elastically deformable, wherein, in accordance with this publication, the deformation of the membrane is preferably detected with a sensor arrangement which includes a Hall generator. The membrane and the support element resistant to bending together form a load cell, in the interior of which the sensor arrangement can be accommodated.

A load cell of the type described at the outset, with which the elastic deformation of the membrane is detected with a capacitive sensor arrangement, is likewise known from DE 41 32 108.

The aforementioned load cells have in common the fact that they can receive only pressure forces and, in addition, can be used in rough surroundings only with minimal benefit.

BRIEF SUMMARY OF THE INVENTION

In accordance with an embodiment of the invention, a load cell is provided which is robust and can also be incorporated into narrow spaces and, in particular, can receive and determine tensile forces as well as pressure forces.

In accordance with an embodiment of the invention, a load cell has a multipart housing which is resistant to bending and has an interior space for accommodating and holding the membrane force transducer and the sensor arrangement, wherein the housing surrounds the force transducer essentially on all sides and has an opening, through which the membrane force transducer can be acted upon with the force to be determined, wherein the membrane force transducer comprises a force introduction member arranged centrally and at the edge area an edge part projecting beyond at least one of the membrane surfaces. A recessed area, into which the projecting edge of the membrane force transducer can for example engage in a form-locking manner or press-fit manner (force-locking manner), is formed in the interior space of the housing.

As a result of the use of a housing which is resistant to bending, accommodates the membrane force transducer and the sensor arrangement and surrounds them essentially on all sides, the load cell in accordance with the invention may be of a very robust design and used in a plurality of rough surrounding conditions. This results, in particular, from the fact that not only the sensor arrangement but also the membrane of the force transducer are accommodated in the housing in a, as it were, encapsulated manner. Only one opening in the housing is necessary so that the pressure or tensile force to be determined can act on the membrane force transducer.

The production of the load cell in accordance with the invention, in particular, its assembly is simplified to a great extent due to the multipart housing resistant to bending since this accommodates the membrane force transducer with its projecting edge in a recessed area, for example, a groove, in a form-locking manner. The edge and the recessed area may be designed so as to be adapted to one another from the point of view of production engineering without the resources for this needing to be too great and so the edge of the membrane force transducer will be accommodated in the recessed area in a first housing part free from clearance.

With an additional housing part, the edge of the membrane force transducer can be fixed in a form-locking and/or force-locking manner in the recessed area of the first housing part. This enables a simple exchange of the membrane force transducer to be carried out in the case where the force transducer fails during the final control process.

Otherwise, the load cell in accordance with the invention can be sealed hermetically. This denotes a particularly good resistance to soiling and impairment of its functioning even in very difficult surroundings, for example, in a plurality of arrangement possibilities in an automobile, in particular, in its interior space, as well, in which temperature variations, dust and abrupt loads often occur.

The load cell in accordance with the invention may be used, in particular, for determining weight forces acting on the seat of a motor vehicle, such as those increasingly used, for example, in conjunction with the selective activation of airbag systems. The preferred installation positions are between seat rails and floor pan of the vehicle or between seat shell and seat carcass.

The force introduction member is preferably arranged coaxially to the opening of the housing and, in addition, preferably designed such that it is of an essentially complementary design to the cross section of the opening so that the opening of the housing is, as it were, filled essentially by the force introduction member which, in this case, preferably projects at least partially into the opening. A minimum gap must, of course, be provided between force introduction member and opening in order to be able to have the force introduction member transfer the force acting on the load cell to the membrane essentially free from friction. Gaps of between approximately 0.1 to approximately 0.5 mm have proven to be successful in practice. In this respect, it may be provided for the opening of the housing to be acted upon with a plastic covering, for example, in the form of a sleeve, wherein the plastic material is selected with a view to as low a coefficient of friction as possible.

Alternatively, it may also be provided for the force introduction member to be designed such that it protrudes beyond the surface of the housing and for a screening sleeve consisting of a flexible material which essentially does not influence the force acting on the force introduction member to be provided for sealing the gap between opening and force introduction member.

In addition, the load cell according to the invention will preferably have an integrated mechanical overload protection. Such a mechanical overload protection may be provided for tensile and/or pressure forces and means that in the case of any action of an excessively large force, i.e., a force no longer admissible for the safe functioning of the load cell this cannot act unhindered on the membrane. For this purpose, it is provided for one or several stop surfaces to be formed in the interior of the housing, these surfaces limiting an elastic deformation of the membrane force transducer when acted upon by tensile and/or pressure forces. In this respect, the force introduction member can then be supported, for example, on one stop so that the maximum deformation of the membrane force transducer remains limited and, as a result, any mechanical damage due to overload is precluded.

In the case of several stop surfaces, at least one of the stop surfaces will undertake the function of the overload protection with respect to pressure forces and another an overload protection with respect to tensile forces.

The countersurface interacting with the stop surfaces may be formed either on the membrane force transducer itself or, however, on the force introduction member. For example, the force introduction member may have a projection which interacts with one or other of the stop surfaces or the several stop surfaces in the sense of limiting tensile and/or pressure forces which can act on the membrane force transducer.

The force introduction member itself is often of an essentially cylindrical design and so the opening of the housing is, accordingly, also of a cylindrical design. In one preferred embodiment, the force introduction member supports an annular flange which acts as a projection in the sense of the aforementioned overload protection. Alternatively, it may also, of course, be provided for the force introduction member to have a recess, into which a projection which is arranged securely on the housing engages and provides for a limitation of the possible movement of the force introduction member in this way.

The annular flange of the force introduction member can, however, also advantageously undertake an additional function, namely of connecting the force introduction member to the membrane. In this respect, the connection between membrane and annular flange is preferably configured such that the annular flange protrudes beyond the membrane surface on both sides of the membrane so that the annular flange can cooperate with stop surfaces of the housing above and below the membrane in the sense of an overload protection.

The membrane and the force introduction member may be designed in one piece in the case of several embodiments, i.e., membrane and force introduction member are worked from the solid material.

Alternatively, it may also be provided for the membrane to be welded to the force introduction member, in particular, to its annular flange.

The membrane is preferably designed as a circular disc. For the purpose of the secure and defined attachment of the membrane in the housing, the projecting edge is designed as an annular collar or as annular collar segments arranged at regular angular distances on the circumference, and the housing again has an annular groove in its interior, into which the annular collar or rather the segments of the membrane can be inserted during the assembly of the load cell.

This allows a very simple and, nevertheless, very exact mounting of the membrane in the housing resistant to bending. The housing resistant to bending is preferably closed by a base part which acts on the free surface of the annular collar of the membrane and presses it into the annular groove.

The force introduction member is, on the one hand, as already mentioned, secured to the membrane itself and has, in addition, a free end which preferably comprises a screw thread which is accessible through the opening of the housing or even protrudes out of it.

As a result, the load cell with the force introduction member is very easy to install and, for example, can also be used as a screw bolt as installation means directly at the place where it is to be used.

In the latter case, the housing will preferably, with respect to the plane defined by the membrane, have a screw bolt located opposite the opening or a screw thread oriented coaxially to the opening. As a result, the load cell may be installed very easily at the location of its use by means of screw connections on both sides.

The force introduction member may also extend, in a preferred embodiment, through the plane of the membrane, wherein the first free end of the force transducer extends in the direction towards the opening of the housing and a second free end extends in the interior of the housing away from the membrane on its other side and ends in the interior of the housing.

This free end will preferably support an element of the sensor arrangement while an additional element of the sensor arrangement is mounted securely on the housing.

In general, it may be ascertained that the membrane is to be designed as a regular polygon with a center of symmetry, at which the force introduction member is then arranged.

A simple example for this would be a strip-like design of the membrane, wherein the force introduction member would then be arranged centrally to the longitudinal direction of the membrane strip. A triangular membrane would, for example, also be conceivable, in the same way as other polygonal shapes.

In a special case of this which is, however, the most preferred case, the membrane has the shape of a circular disc, as has already been described in the above.

The sensor arrangement used for the load cell in accordance with the invention may be selected from various known sensor arrangements, wherein sensor arrangements which operate free from contact are, however, clearly preferred. Nevertheless, this does not preclude the use of one or several wire strain gauges.

However, as stated, the sensor arrangements for a contact-free distance measurement are preferred, such as, for example, those operating inductively as well as those operating capacitively. In addition, an optical sensor arrangement is also particularly suitable.

A sensor arrangement operating inductively is particularly suitable within the meaning of the present invention, in particular, one which comprises a Hall sensor as one element and a magnet as an additional element. In the case of the magnet, a permanent magnet will be used, in particular.

In the case of this particularly preferred embodiment of the invention, the magnet may be arranged on the force introduction member and the Hall sensor on the housing. A reverse arrangement, i.e., the arrangement of the magnet on the housing and the arrangement of the Hall sensor on the force introduction member is likewise possible but the first variation is preferred since this has the advantage that the signal lines of the sensor may be guided in the housing material and are, therefore, to be arranged in a very space-saving and, at the same time, protected manner. At the same time, any falsifying of the weight signal due to the presence of signal lines can be avoided.

With such an embodiment, the housing of the load cell is preferably formed from ferromagnetic steel with the advantage that the sensor arrangement is encapsulated not only mechanically but also electro-magnetically. The force introduction member itself which accommodates the magnet, in particular, the permanent magnet is then to be produced, however, from a non-magnetic steel since otherwise a magnetic short circuit would result.

The Hall sensor and the magnet of the sensor arrangement are preferably designed and arranged such that in the no-load state of the load cell the Hall sensor generates an electric signal with a value smaller than or equal to $\frac{1}{3}$ of the maximum effective signal.

This ensures that a sufficient reserve for amplifying the effective signal is provided for the evaluation circuit which is likewise preferably to be arranged in the interior of the load cell and an adequate signal-to-noise ratio is present.

In a first variation, the magnet may be designed to act as a monopole in relation to the Hall sensor, wherein the Hall sensor comprises an even number of sensor elements which are arranged in the form of a two-dimensional matrix located opposite the monopole. In this respect, two sensor elements form each time one part of an electronic differential circuit.

Alternatively, the magnet may be designed to act as a dipole in relation to the Hall sensor, wherein the Hall sensor comprises one or several sensor elements, the signals of which can be detected separately.

It is conceivable, in particular, for two Hall sensors to be arranged diametrically opposite in relation to the force introduction member or rather its longitudinal direction and to be evaluated when the magnet is arranged in the force introduction member.

As already mentioned above, another alternative consists in selecting an optical sensor arrangement.

In this respect, the sensor arrangement will preferably comprise a light source and a slot diaphragm, on the one hand, and a differential photodiode, on the other hand. In one arrangement, the light source and the slot diaphragm are held together on the force transducer, for example, on the force introduction member whereas the differential photodiode is arranged on the housing so as to be stationary.

Alternatively, the sensor arrangement can have the light source and the slot diaphragm arranged, on the one hand, so as to be secured to the housing whereas the differential photodiode is arranged on the force transducer, i.e., in particular on the force introduction member.

These and additional advantages of the present invention will be explained in greater detail in the following on the basis of the drawings.

BRIEF DESCRIPTION OF THE SEVERAL VIEWS OF THE DRAWING(S)

FIG. 1: shows a sectional view through a first embodiment of a load cell in accordance with the invention;

FIG. 2: shows a sectional view through a second embodiment of a load cell in accordance with the invention;

FIG. 3: shows a sectional view through a third embodiment of a load cell in accordance with the invention;

FIG. 4: shows a sectional view through a fourth embodiment of a load cell in accordance with the invention.

FIG. 5 shows a sectional view through a fifth embodiment of a load cell in accordance with the invention.

FIG. 6 shows a sectional view through a sixth embodiment of a load cell in accordance with the invention.

FIG. 7 shows a sectional view through a seventh embodiment of a load cell in accordance with the invention.

DETAILED DESCRIPTION OF THE INVENTION

Figure 1:
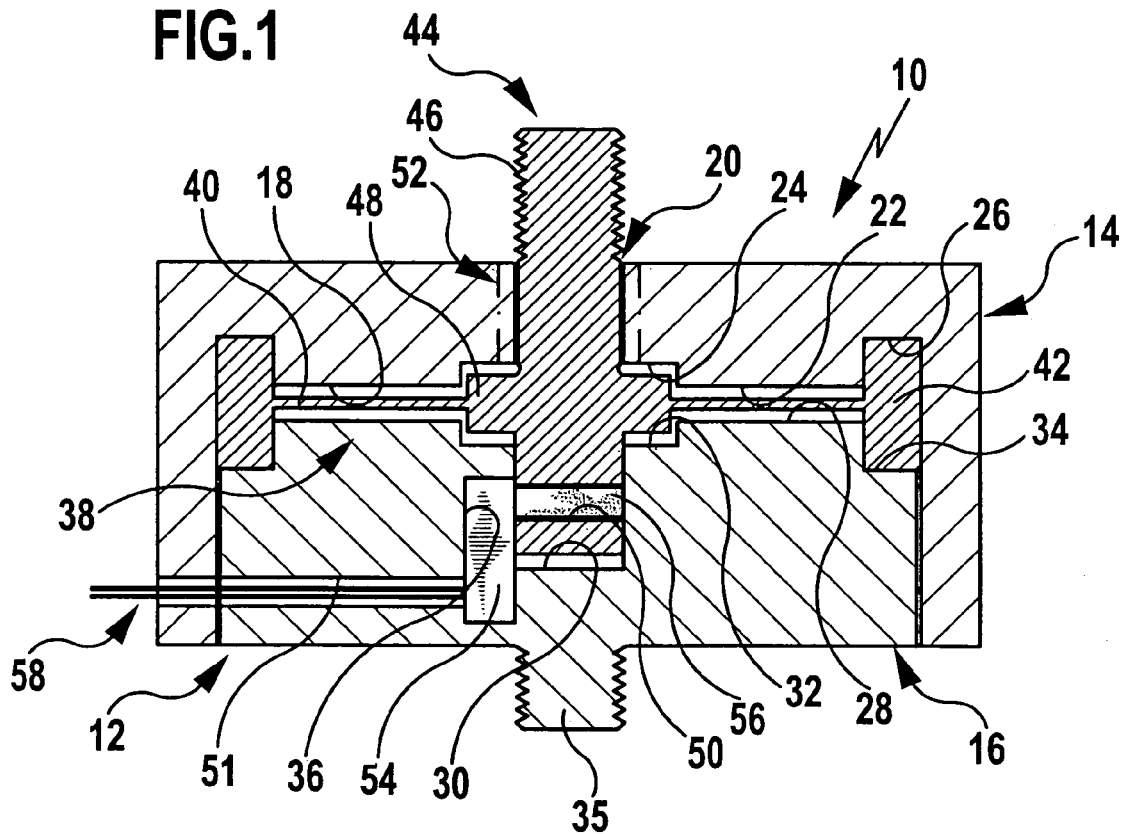

FIG. 1 shows a load cell provided altogether with the reference numeral 10 in a first embodiment. The load cell 10 comprises a housing 12 which is resistant to bending and has a hollow-cylindrical cover part 14 closed on one side and a base part 16 closing the cover part 14. The cover part 14 forms with the base part 16 an interior space 18 which communicates with the surroundings of the load cell 10 merely via an opening 20 in the cover part 14.

The interior space 18 is essentially in the shape of a circular disc and is limited on the side of the cover part 14 by an end wall 22 which is essentially designed in the shape of an annular disc and borders on the opening 20 in its center.

Adjacent to the opening 20, the end wall 22 is recessed in an annular shape (reference numeral 24). At its outer circumference, the end wall 22 merges into an annular groove 26.

The interior surface of the base part 16 has an end side 28 which is essentially designed complementary to the end wall 22 and borders centrally on a blind-end bore 30 arranged coaxially to the opening 20. Around the blind-end bore 30, the end side 28 has a recess 32 which is essentially designed in mirror image to the recess 24 of the end wall 22. At the outer circumference of the end side 28, a recess 34 is provided which extends all the way around and is essentially designed in mirror image to the groove 26 of the end wall 22. At its outwardly located surface, the base part 16 bears a screw bolt 35 coaxially to the blind-end bore 30.

Adjacent to the base of the blind-end bore 30, this widens to form a receiving means 36, in which a component of a sensor arrangement of the load cell 10, which is still to be explained, is accommodated.

A membrane force transducer 38 is accommodated in the interior space 18 and this has a membrane 40 which is in the shape of a circular disc and bears at its circumferential edge an annular collar 42 which projects beyond both surfaces of the membrane 40. The annular collar 42 is, in cross section, of an essentially rectangular design and engages without clearance in the groove 26 in the end side 22 of the cover part 14.

The membrane 40 is preferably designed in one piece with the annular collar 42 or, however, the annular collar 42 is welded to the membrane 40 at its outer circumference. In the engaged state of the annular collar 42 in the groove 26, a gap remains between the membrane surface and the end wall 22 and this allows an elastic deformation of the membrane when acted upon with a tensile or pressure force.

A force introduction member 44 is arranged in the center of the membrane 40 and this has essentially the shape of a bolt. One end of the force introduction member passes through the opening 20 and is provided with a screw thread 46 whereas the other, free end of the force introduction member 44 is accommodated by the blind-end bore 30. The opening 20 as well as the blind-end bore 30 form a guide for the force introduction member 44 which supports the force introduction member against any tilting moments.

In the area where it penetrates the membrane 40, the force introduction member bears a circumferential annular flange 48, via which the force introduction member 44 is connected to the membrane 40. The force introduction member 44 may, in principle, be designed in one piece with the membrane 40 and the annular collar 42 or, however, be produced as a separate part and inserted into a passage in the membrane 40 and then welded to it.

The annular flange 48 interacts with the recesses 24 and 32 as a mechanical overload protection, i.e., the elastic deformation of the membrane 40 is limited by the displaceability of the force introduction member 44 in the direction of the axis of symmetry of the opening 20 as well as the blind-end bore 30 and limits the action of tensile or pressure forces and, therefore, the deformation of the membrane due to abutment of the annular flange 48 on the recess 24 or the recess 32.

A transverse bore 50, which makes a receiving means available for an additional element of the sensor arrangement of the load cell 10, is provided in the end of the force introduction member 44 engaging in the blind-end bore 30.

In order, as far as possible, for the determination of the weight force acting on the load cell not to be influenced, it may be provided for the opening 20 and, where applicable, also the wall of the blind-end bore 30 to be covered with a material, for example, in the form of a sleeve 52 (cf. dash-dot illustration at opening 20) which has as low a sliding friction as possible.

The sensor arrangement of the load cell 10 according to the invention consists essentially of Hall sensor element(s) 54, 54', 54"a, 54"b, 54"c and a permanent magnet 56, 56', 56". The permanent magnet 56 is fixed in the transverse bore 50 of the force introduction member 44 and moves together with the force introduction member 44 along its longitudinal direction away from the base part 16 or towards it during the action of tensile and pressure forces, respectively.

The receiving means 36 provided in the base part 16 accommodates the Hall sensor element 54 which is connected via signal and energy supply lines 58 via a bore 51 in the base part 16 as well as a passage in a side wall of the cover part 14 which is aligned thereto.

When selecting the sensor arrangement, as mentioned above, the cover part 14 as well as the base part 16 will preferably be formed from ferromagnetic steel so that an electromagnetic screen for the Hall sensor arrangement results.

The force introduction member 44 is produced from a non-magnetic material, in particular, non-magnetic steel in order to avoid any magnetic short circuit. The material, from which the membrane 40 as well as the annular member 42 are formed, may be selected from different materials, for example, aluminum.

Aluminum is also suitable for producing the force introduction member 44. The membrane 40 as well as the annular member 42 may, however, also be produced from steel.

If other sensor arrangements are used, for example, an optical sensor arrangement as described at the outset, comparable assembly conditions to those shown in FIG. 1 can be selected. In this case, greater freedoms result in the selection of the materials, from which the individual components of the load cell are formed, since optical sensor arrangements cannot be influenced as such by electromagnetic radiations occurring in the surrounding environment. However, it is often advantageous to design evaluation electronics together with a sensor element, whether this be a Hall sensor element or an optical detection element, and to arrange them in the interior of the load cell such that signals already processed can be transferred to the outside via the connection lines 58. In such a case, it is also preferable in the case of an optical sensor arrangement to use an electromagnetic, screening material for the production of the cover part 14 and the base part 16 in order to ensure a reliable functioning of the sensor arrangement electronics even in the case of rough, electromagnetic surroundings.

The characteristics of a sensor arrangement with Hall sensor and permanent magnet are not exactly linear but a linearization of the sensor signal need not occur when a precision of 1% is adequate.

A particularly high temperature stability may be achieved with this sensor arrangement as a result of the fact that two Hall sensor elements are arranged opposite a monopole on the part of the permanent magnet and the signal is received as a differential signal. Alternatively thereto, the arrangement of the magnet 56', 56" as a dipole opposite a Hall sensor element 54' or Hall sensor elements 54"a, 54"b, 54"c could be considered.

At the same time, it is possible with the differential measurement for a maximum effective signal to be obtained via the amplifier arrangement and for this to be obtainable essentially unloaded from a zero point level.

The Hall sensor may often be integrated with an analog-to-digital converter on a chip so that digitalized signals are obtained from the load cell and these signals are not susceptible to interference even in rough electromagnetic surroundings.

Figure 2:
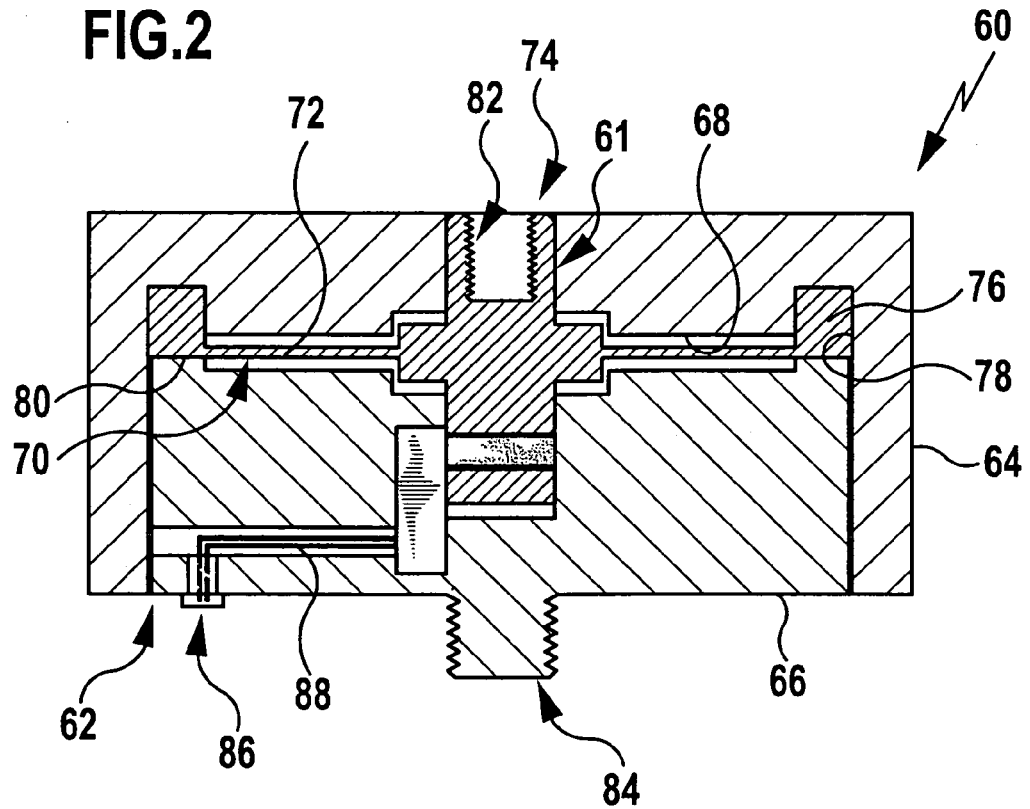

FIG. 2 shows a second embodiment of a load cell 60 according to the invention with a housing 62 which is formed by a cover part 64 and a base part 66. In the interior of the housing 62, a disc-shaped interior space 68 is created between the cover part 64 and the base part 66 and a membrane force transducer 70 is accommodated in this space.

The force transducer 70 is essentially of the same construction as the force transducer 44 of FIG. 1 and has a force introduction member 74 in its center next to a membrane 72 as well as an annular collar 76 projecting beyond a surface of the membrane 72 at the circumferential edge. In the assembled state, the annular collar 76 engages without clearance in an annular groove 78 formed complementarily in the cover part 64 and is held in this position by the base part 66. For this purpose, the base part 66, in contrast to the base part 16 of FIG. 1, has at its external circumference a projection 80 which extends all the way around and abuts against the annular collar 76. The inwardly located surface of the base part 66 is at a distance in relation to the membrane 72.

In the central area of the internal space 68, recesses are again provided in the respective inner surfaces of the cover part 64 and the base part 66 and these offer, with a corresponding annular flange on the part of the force introduction member 74, a mechanical overload protection against tensile and pressure forces which are too large.

In contrast to the force introduction member 44, the force introduction member 74 does not protrude beyond the outer surface of the cover part 64 but ends approximately level with the outer surface. In order to be able to connect the force introduction member 74 to the surroundings, in order to be able to determine tensile and/or pressure forces with the load cell 60 in a reliable manner, the force introduction member 74 has a blind-end bore 82 with an internal thread at its free end pointing towards the outer surface of the cover part. On the opposite side, the base part 66 has a screw bolt 84 which extends away from the outer surface of the base part 66 in axial direction of the force introduction member. A blind-end bore could, of course, also be machined into the base part 66 instead of the screw bolt 84 and this would then preferably have an internal thread.

The arrangement and the construction of the sensor arrangement in FIG. 2 is similar to that in FIG. 1 and will not be discussed here in greater detail for this reason. In comparison with FIG. 1, the connection of the sensor arrangement to the surroundings is, however, accomplished differently. In this case, a socket connector 86 is provided in the base part 66, at which signal and supply lines 88 of the sensor arrangement end, so that the load cell 60 can be connected, for example, to an associated electronic evaluation circuit or be disconnected from it in a simple manner.

FIG. 3 shows an additional, alternative embodiment of a load cell 90 with a housing 92 with a cover part 94 and a base part 96 which are, again, designed in a similar way to the corresponding parts in FIG. 1.

Cover part 94 and base part 96 define between them an interior space 98 which serves to accommodate a membrane force transducer 100. The force transducer 100 consists of a membrane 102 which bears a circumferential annular collar 104 at its outer circumference and has a force introduction member 106 in the form of a bolt passing through it centrally. The design of the force introduction member 106 is comparable to that shown in FIG. 1 and described and so further details will not be given here. In order to bring about an additional sealing of the housing 92, the force introduction member with its screw bolt section projecting outwards is surrounded by a rubber sleeve 108. As a result, the interior space 98 may be shielded from the surroundings more or less dust-tight.

In the inserted state, the annular collar 104 engages in an annular groove 110 in the inner surface of the cover part 94 and is held in this position by the base part 96. The base part 96 differs in its design from the base part 16 of FIG. 1 in that no annular groove or no annular recess is provided in this case at the outer circumference but rather the surface of the base part 96 is of a flat design in this area. In order to have the inwardly pointing surface of the base part 96 spaced from the surface of the membrane 102, a spacer ring 112 is inserted between the membrane force transducer 100 and the base part 96 in the area of the annular collar 104.

The side walls of the cover part 94 are dimensioned such that they project somewhat beyond the outwardly located surface of the base part 96 in the assembled state of the load cell 90 so that the base part 96 can be fixed in the cover part 94 by wedging it in. This is the simplest and, at the same time, reliable fixing of the base part 96 in the cover part 94 and, at the same time, this type of connection may be brought about in a manner which is just as sealed as, for example, the use of a screw thread or the like. Finally, the welding of base part and cover part also offers a suitable alternative.

The sensor arrangement shown in FIG. 3 is comparable, first of all, with that shown in FIG. 1 and has a Hall sensor element 114 as well as a permanent magnet 116. In this case, however, in contrast to FIG. 1, an additional Hall sensor 118 is used which is located opposite the Hall sensor 114. As a result of such an arrangement of a first and an additional Hall sensor 114, 118, the zero point error of the sensor arrangement may be eliminated in a first approximation.

Finally, FIG. 4 shows a variation of the embodiment of FIG. 1 with respect to the design of the base part as well as the design of the screw connections on the part of the force introduction member and the base part. The fourth embodiment of a load cell 120 according to the invention, as illustrated in this case, has a housing 122 with a cover part 124 and a base part 126. Cover part 124 and base part 126 define between them an interior space 128, in which a membrane force transducer 130 is accommodated. The force transducer 130 consists of a membrane 132, an annular collar 134 projecting beyond both membrane surfaces as well as a force introduction member 136. The cover part 124 as well as the base part 126 have on their inwardly located surfaces respective recesses which extend all the way around, receive the annular collar projecting beyond both surfaces of the membrane 132 between them and clamp it free from clearance.

In contrast to the design of the cover part 14 of FIG. 1, the side walls of the cover part 124 do not extend over the entire height of the load cell 120 while the base part 126 has at its lower end an annular flange 138 which protrudes all the way around and is aligned radially flush with the side walls of the cover part 124. The sensor arrangement of the embodiment of FIG. 4 will not be described in greater detail and it is merely emphasized that in this embodiment a continuous channel leads in radial direction from a recess for accommodating the Hall sensor as far as the outer circumference of the load cell 120 and ends in a socket connector for accommodating these signal lines.

In this case, a screw connection provides a problem-free solution for connecting cover part and base part since the orientation between base part and cover part in the tightened state is irrelevant with a view to the cable guidance used in this case. Alternatively, a weld connection is also suitable.

In order to connect the load cell 120 to the surroundings, the base part 126 has a blind-end bore 140 with an internal thread in the center and a blind-end bore 142 with an internal thread is likewise provided coaxially hereto in the force introduction member 136.

It is understood from the preceding description that the variations in the design of the membrane force transducer specified in FIGS. 1 to 4, in particular, with respect to the annular collar as well as the design of the inner surfaces of the cover part or the base part corresponding hereto can be interchanged in the individual embodiments. The solutions which have been shown in order to provide screw connections to the load cells are likewise interchangeable. Finally, other types of connection are known to the person skilled in the art, such as, for example, welding or gluing, wedge connections etc., with which the base part and/or the force introduction member can be connected to the measurement environment. It is likewise clear that the special embodiment of the sensor arrangement of FIG. 3 can also be transferred to the embodiments of the other Figures.

In a further embodiment in accordance with the invention, the projecting edge of the membrane force transducer is fixed via the housing in force-locking manner. A recessed area is formed in the interior space of the housing. The projecting edge of the membrane force transducer is positioned in the recessed area and acted upon by at least one carrier. The carrier is supported by the housing and exerts a clamping force on the projecting edge to fix the projecting edge in the recessed area in a press-fit manner or force-locking manner.

A corresponding embodiment is shown and described in the German application No. 10 2005 010 982.9 of Mar. 3, 2005.

The invention claimed is:

1. A load cell comprising:
   an elastically deformable membrane force transducer for receiving pressure and tensile forces to be determined;
   a sensor arrangement for detecting the deformation of the membrane force transducer and its conversion into an electric weight signal, wherein the sensor arrangement comprises a sensor arrangement for a contact-free distance measurement and the sensor arrangement is a sensor arrangement operating inductively; and
   a multipart housing resistant to bending and having an interior space for accommodating and holding the membrane force transducer and the sensor arrangement,
   wherein the housing surrounds the force transducer essentially on all sides;
   wherein the housing has an opening, the membrane force transducer being able to be acted upon with the force to be determined through said opening;
   wherein the membrane force transducer comprises a force introduction member arranged centrally;
   wherein the membrane force transducer comprises a membrane having surfaces and at an edge area an edge part projecting beyond at least one of the membrane surfaces;
   wherein the projecting edge part of the membrane force transducer is held via the housing;
   wherein one or several stop surfaces are formed in the interior of the housing, said stop surfaces limiting the elastic deformation of the membrane force transducer when acted upon by tensile and/or pressure forces; and
   wherein the force introduction member has a projection interacting with the one or the several stop surfaces in the sense of limiting tensile and/or pressure forces.

2. The load cell as defined in claim 1, wherein the force introduction member is arranged coaxially to the opening of the housing.

3. The load cell as defined in claim 1, wherein the force introduction member extends at least partially into the opening.

4. The load cell as defined in claim 3, wherein the opening guides the force introduction member and secures it against tilting moments.

5. The load cell as defined in claim 3, wherein a gap is present between the force introduction member and the opening, said gap having a width of approximately 0.1 mm to approximately 0.5 mm.

6. The load cell as defined in claim 1, wherein the force introduction member is essentially of a cylindrical design.

7. The load cell as defined in claim 6, wherein the projection is an annular flange.

8. The load cell as defined in claim 7, wherein the force introduction member is connected to the membrane via the annular flange and wherein an annular collar protrudes beyond the membrane surface on both sides of the membrane.

9. The load cell as defined in claim 1, wherein the membrane and the force introduction member are designed in one piece.

10. The load cell as defined in claim 1, wherein the membrane is designed as a circular disc, wherein the projecting edge is designed as a circumferential annular collar or as annular collar segments arranged at regular angular distances on the circumference and wherein the housing has an annular groove in its interior, the annular collar or the annular collar segments being insertable into said annular groove in a form-locking manner.

11. The load cell as defined in claim 1, wherein the force introduction member comprises a screw thread at its free end facing away from the membrane.

12. The load cell as defined in claim 1, wherein the force introduction member extends through the plane of the membrane, wherein a first free end of the force transducer extends in the direction towards the opening in the housing and a second free end ends in the interior of the housing and supports an element of the sensor arrangement.

13. The load cell as defined in claim 1, wherein in relation to a plane defined by the membrane, the housing has a screw bolt located opposite the opening or a screw thread oriented coaxially to the opening.

14. The load cell as defined in claim 1, wherein the projecting edge of the membrane force transducer is fixed in a form-locking and/or force-locking manner.

15. The load cell as defined in claim 1, wherein a recessed area is formed in the interior space of the housing.

16. The load cell as defined in claim 15, wherein the projecting edge of the membrane force transducer is held via the recessed area.

17. The load cell as defined in claim 16, wherein the projecting edge is engageable in said recessed area in a form-locking and/or force-locking manner.

18. A load cell comprising:
an elastically deformable membrane force transducer for receiving pressure and tensile forces to be determined;
a sensor arrangement for detecting the deformation of the membrane force transducer and its conversion into an electric weight signal; and
a multipart housing resistant to bending and having an interior space for accommodating and holding the membrane force transducer and the sensor arrangement,
wherein the housing surrounds the force transducer essentially on all sides;
wherein the housing has an opening, the membrane force transducer being able to be acted upon with the force to be determined through said opening;
wherein the membrane force transducer comprises a force introduction member arranged centrally;
wherein the membrane force transducer comprises a membrane having surfaces and at an edge area an edge part projecting beyond at least one of the membrane surfaces;
wherein the projecting edge part of the membrane force transducer is held via the housing;
wherein the force introduction member extends at least partially into the opening; and
wherein a gap is present between the force introduction member and the opening, said gap having a width of approximately 0.1 mm to approximately 0.5 mm.

19. A load cell comprising:
an elastically deformable membrane force transducer for receiving pressure and tensile forces to be determined;
a sensor arrangement for detecting the deformation of the membrane force transducer and its conversion into an electric weight signal; and
a multipart housing resistant to bending and having an interior space for accommodating and holding the membrane force transducer and the sensor arrangement,
wherein the housing surrounds the force transducer essentially on all sides;
wherein the housing has an opening, the membrane force transducer being able to be acted upon with the force to be determined through said opening;
wherein the membrane force transducer comprises a force introduction member arranged centrally;
wherein the membrane force transducer comprises a membrane having surfaces and at an edge area an edge part projecting beyond at least one of the membrane surfaces;
wherein the projecting edge part of the membrane force transducer is held via the housing; and
wherein the force introduction member extends through the plane of the membrane, wherein a first free end of the force transducer extends in the direction towards the opening in the housing and a second free end ends in the interior of the housing and supports an element of the sensor arrangement.

20. A load cell comprising:
an elastically deformable membrane force transducer for receiving pressure and tensile forces to be determined;
a sensor arrangement for detecting the deformation of the membrane force transducer and its conversion into an electric weight signal, wherein the sensor arrangement comprises a sensor arrangement for a contact-free distance measurement and the sensor arrangement comprises a Hall sensor and a magnet; and
a multipart housing resistant to bending and having an interior space for accommodating and holding the membrane force transducer and the sensor arrangement,
wherein the housing surrounds the force transducer essentially on all sides;
wherein the housing has an opening, the membrane force transducer being able to be acted upon with the force to be determined through said opening;
wherein the membrane force transducer comprises a force introduction member arranged centrally;
wherein the membrane force transducer comprises a membrane having surfaces and at an edge area an edge part projecting beyond at least one of the membrane surfaces;
wherein the projecting edge part of the membrane force transducer is held via the housing;
wherein one or several stop surfaces are formed in the interior of the housing, said stop surfaces limiting the elastic deformation of the membrane force transducer when acted upon by tensile and/or pressure forces; and wherein the force introduction member has a projection interacting with the one or the several stop surfaces in the sense of limiting tensile and/or pressure forces.

21. The load cell as defined in claim 20, wherein the magnet is a permanent magnet.

22. The load cell as defined in claim 20, wherein the magnet is arranged on the force introduction member and the Hall sensor on the housing.

23. The load cell as defined in claim 20, wherein the magnet is arranged on the housing and the Hall sensor on the force introduction member.

24. The load cell as defined in claim 20, wherein the Hall sensor and the magnet of the sensor arrangement are designed and arranged such that in a no-load state of the load cell the Hall sensor generates an electric signal with a value smaller than or equal to one third of the value of the maximum effective signal.

25. The load cell as defined in claim 24, wherein the magnet acts as a dipole in relation to the Hall sensor and wherein the Hall sensor comprises one or several sensor elements, the signals of said sensor element or elements being detectable separately.

26. The load cell as defined in claim 20, wherein the magnet is arranged on the force introduction member and wherein the Hall sensor comprises two Hall sensor elements held on the housing in positions located diametrically opposite to one another in relation to the force introduction member.

* * * * *